United States Patent
Amann et al.

(10) Patent No.: US 6,375,564 B1
(45) Date of Patent: Apr. 23, 2002

(54) RAMP SEGMENT FOR A COMBINE ROTOR

(75) Inventors: Craig Amann, Port Byron; Daniel Marc Heim, Moline; Corwin Marcus Raymond Puryk, East Moline, all of IL (US)

(73) Assignee: Deere & Company, Moline, IL (US)

(*) Notice: Subject to any disclaimer, the term of this patent is extended or adjusted under 35 U.S.C. 154(b) by 0 days.

(21) Appl. No.: 09/451,187

(22) Filed: Nov. 29, 1999

(51) Int. Cl.[7] .................................................. A01F 12/22
(52) U.S. Cl. .............................. 460/66; 460/71; 460/84; 460/121
(58) Field of Search ........................... 460/84, 113, 121, 460/122, 71, 72, 73, 79, 80, 59, 66

(56) References Cited

U.S. PATENT DOCUMENTS

| | | | |
|---|---|---|---|
| 3,848,609 A | * | 11/1974 | Mortier et al. |
| 4,178,943 A | * | 12/1979 | West |
| 4,362,168 A | * | 12/1982 | Hengen et al. |
| 4,936,810 A | | 6/1990 | Strong et al. |
| 4,946,419 A | * | 8/1990 | Cromheecke et al. |
| 5,112,279 A | | 5/1992 | Jensen et al. |
| 5,192,245 A | * | 3/1993 | Francis et al. |
| 5,376,047 A | * | 12/1994 | Harden et al. |
| 5,445,563 A | | 8/1995 | Stickler et al. |
| 5,688,170 A | | 11/1997 | Pfeiffer et al. |
| 6,036,598 A | * | 3/2000 | Harden et al. |

* cited by examiner

Primary Examiner—H. Shackelford

(57) ABSTRACT

A rotary combine is equipped with a rotor that has a separating portion having at least one ramp segment mounted to the rotor. The ramp segments provide an inclined face that directs the grain radially outward as the ramp segments move through the crop material. The ramp segments are intermixed with tines on the separator section of the rotor. The ramp segments provide a face that is trapezoidal in shape, having inwardly inclined front and rear edges so that the radially distal edge of the face is shorter than the proximal edge of the face. The trapezoidal shape of the ramp segments assists the ramp segments in shedding crop material and thereby preventing the crop material from becoming entangled thereon.

10 Claims, 5 Drawing Sheets

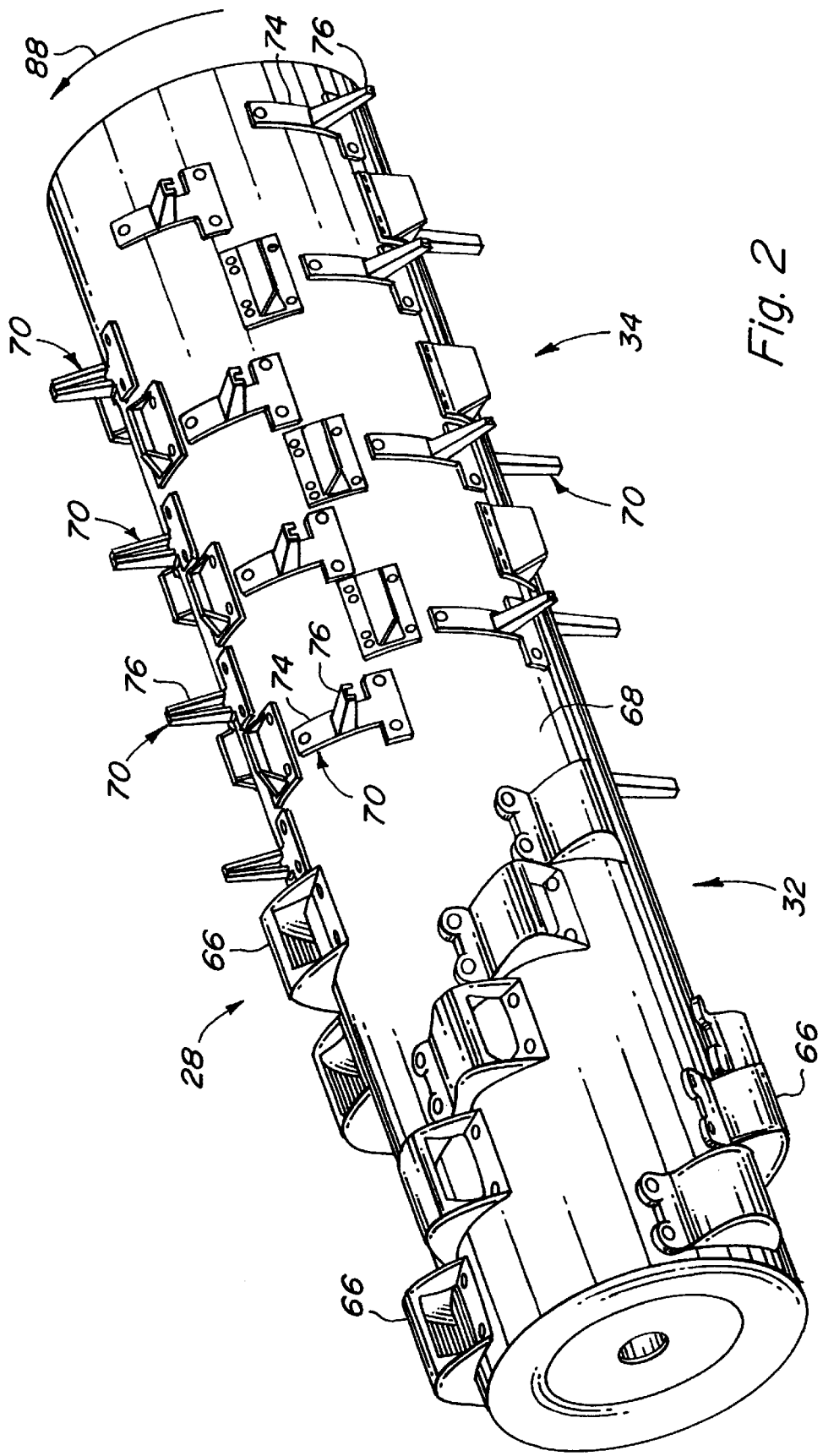

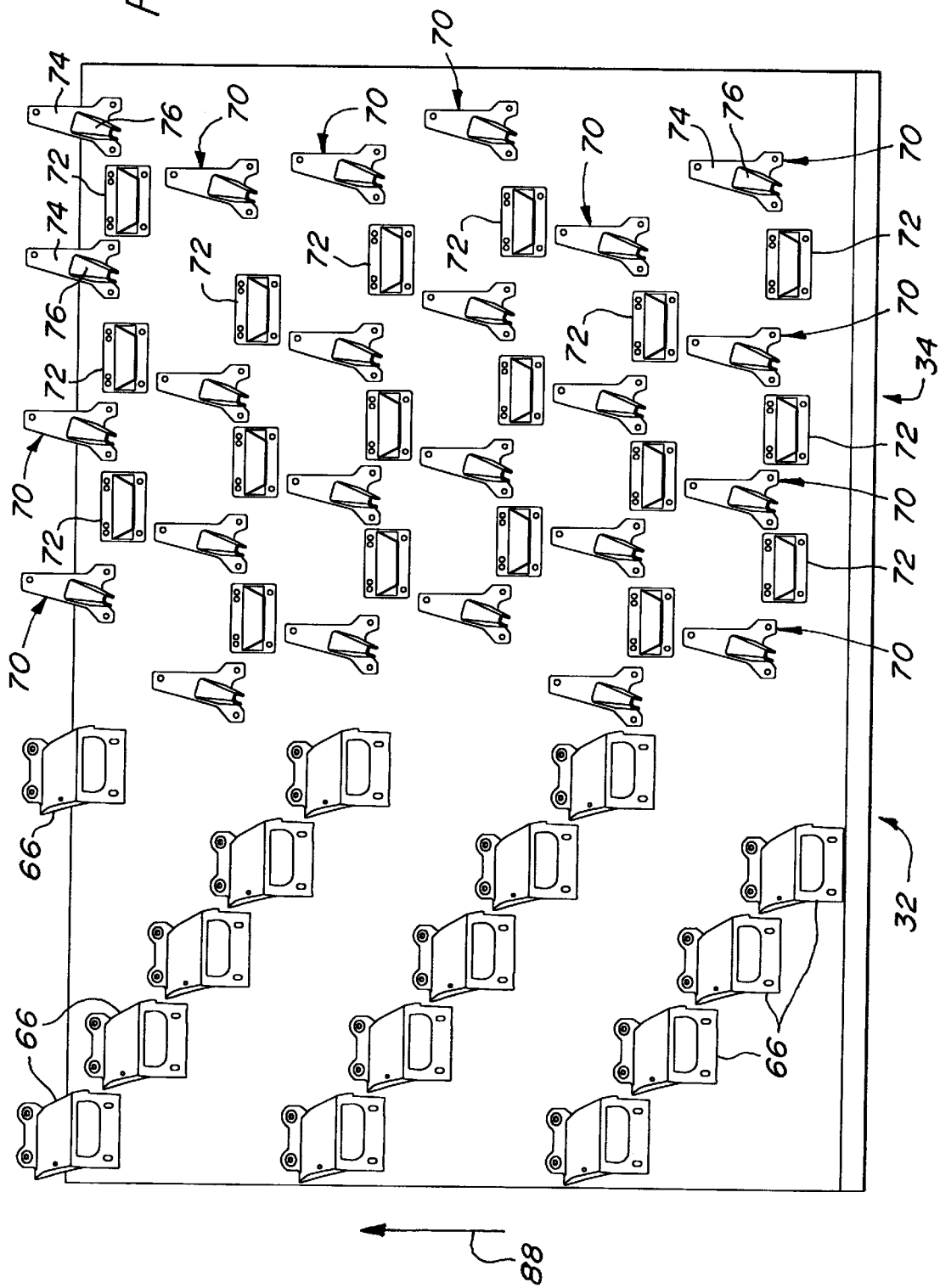

RAMP SEGMENT FOR A COMBINE ROTOR

BACKGROUND OF THE INVENTION

1. Field of the Invention

The present invention relates to a rotary agricultural combine having an axially aligned rotor and housing in which at least a portion of the rotor is provided with a plurality of spaced apart tines with at least one ramp segment between the tines that provides an inclined face to urge the grain radially outward from the rotor body.

2. Description of the Related Art

Rotary combines, such as those disclosed in U.S. Pat. Nos. 5,445,563 and 5,688,170, assigned to the Assignee of the present application, include a single rotor within a rotor housing having threshing and separating sections. Other rotary combines, such as those disclosed in U.S. Pat. No. 4,936,810 have two rotors arranged side-by-side. These two rotors also have threshing and separating sections.

The Assignee of the present application has also developed and markets a hybrid combine having a conventional transverse threshing cylinder and a rotary separator. This hybrid system is illustrated in U.S. Pat. No. 5,112,279. The separator unit disclosed in that patent comprises a rotor housing having a pair of side-by-side rotors therein.

The rotors in the above patents contain crop engaging elements about the periphery of the rotor body. In U.S. Pat. No. 5,688,170, the crop engaging elements on the separating portion of the rotor are finger-like tines projecting radially outward from the rotor body. The tines penetrate the crop material and pull the crop material around the rotor, rather than pushing the material as is typical of other rotary combines. This pulling action prevents the material from rolling and forming ropes of material or slugs that may jam the separator. Due to the shape of the rotor housing, the crop material is initially engaged by the tines, rotated and then released as the crop material is thrown upwardly against crop directing vanes on the upper portion of the rotor housing. The vanes drive the crop material rearwardly. The releasing of the crop material is due to the centrifugal force lifting the crop material off the tines into the space located above the rotor that is formed by a non-concentric housing. Separation of the grain from the crop material is accomplished by the grain moving radially outward through grates at the bottom of the rotor housing.

SUMMARY OF THE INVENTION

The processing capacity of the combine can be increased by improving the ability of the combine to separate the grain from the crop material. Then, more crop material can be processed by the separator without decreasing the efficiency of the separator, i.e. without losing more grain out the rear of the combine.

It is a feature of the combine of the present invention that the separator capacity is increased by providing the rotor with one or more radially projecting ramp segments intermixed with the spaced apart tines. The ramp segments provide an inclined face that directs the grain radially outward as the ramp segments move through the crop material. The ramp segments provide a face that is trapezoidal in shape, having inwardly inclined front and rear edges such that the radially outer edge of the ramp face is shorter than the inner edge of the face. The trapezoidal shape of the ramp segments facilitates shedding of crop material and thereby prevents the crop material from being entangled on the ramp segments.

Initial testing has shown the ramp segments to be most beneficial in small grain harvesting. The testing has also shown the greatest increase in separating capacity when the number of ramp segments is in the range of approximately 25% to 50% of the number of tines. As the number of ramp segments increases, so does the power required to turn the rotor.

BRIEF DESCRIPTION OF THE DRAWINGS

FIG. 2 is a perspective view of the rotor illustrating the crop engaging elements including the ramp segments of the present invention.

FIG. 3 is a plan view of the rotor shown in FIG. 2.

DESCRIPTION OF THE PREFERRED EMBODIMENT

Figure 1:
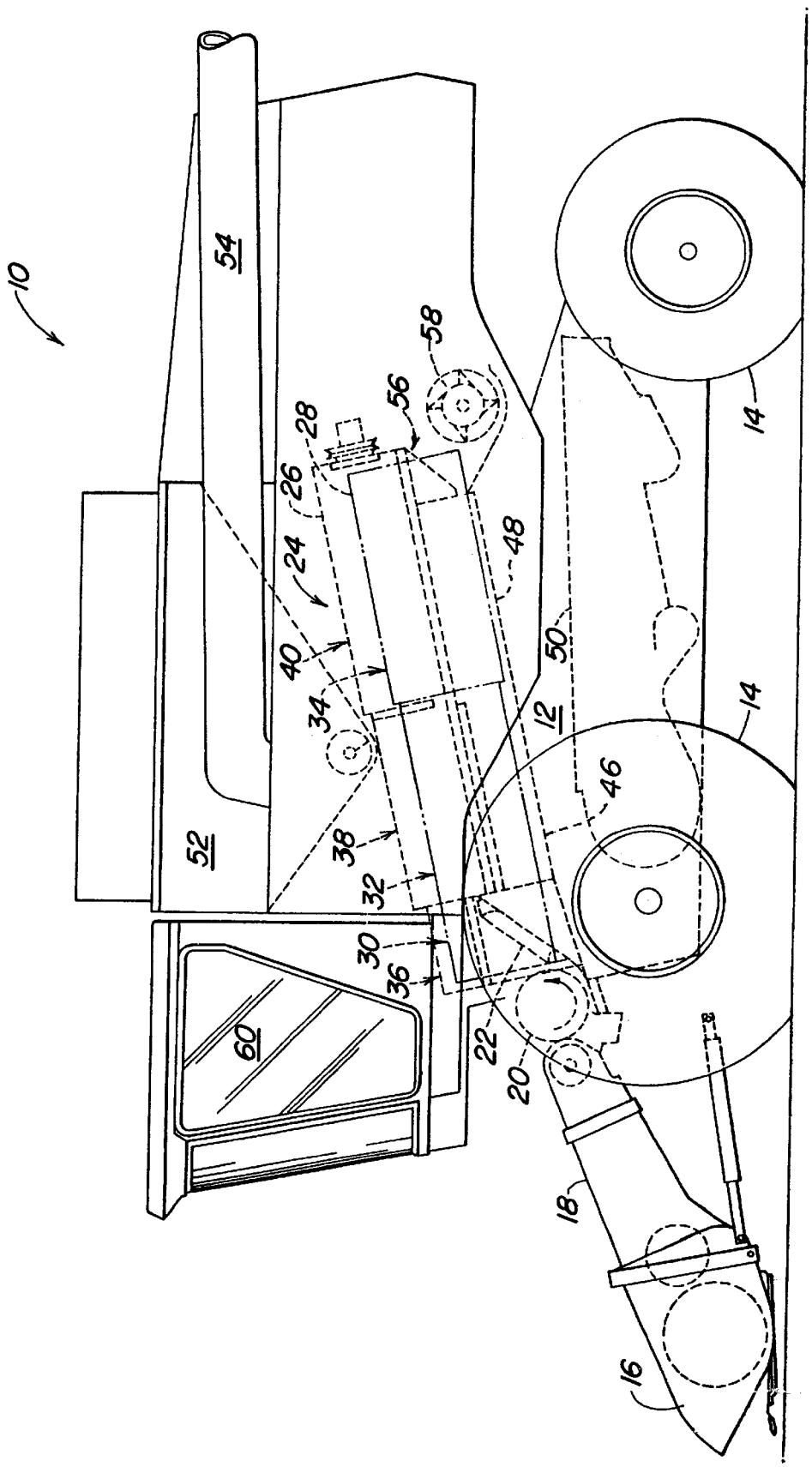
FIG. 1 is a side view of a rotary agricultural combine.

FIG. 1 shows an agricultural combine 10 comprising a supporting structure 12 having ground engaging means 14 extending from the supporting structure. In the illustrated embodiment, the ground engaging means includes wheels and tires, but track assemblies, either steel or rubber, may also be used. A harvesting platform 16 is used for harvesting a crop and directing it to a feederhouse 18. The harvested crop is directed by the feederhouse 18 to a beater 20. The beater directs the crop upwardly through an inlet transition section 22 to an axial crop processing unit 24. The axial crop processing unit is located between the sidesheets of the combine. The sidesheets form part of the supporting structure 12.

The axial crop processing unit 24 comprises an axial rotor housing 26 with an axial rotor 28 located in the housing. The harvested crop enters the housing through the inlet transition section 22. The rotor is provided with an infeed portion 30, a threshing portion 32 and a separating portion 34. The rotor housing has a corresponding infeed section 36, a threshing section 38 and a separating section 40.

Both crop processing portions of the rotor, the threshing portion 32 and the separating portion 34, are provided with crop engaging members. The threshing section 38 of the rotor housing is provided with a concave 46 and the separating section is provided with a grate 48. Grain and chaff released from the crop mat falls through the concave 46 and the grate 48. The concave and grate prevent the passage of crop material larger than grain or chaff from entering the cleaning system 50.

As illustrated in FIG. 1, grain and chaff falling through the concave 46 and grate 48 is directed to cleaning system 50 which removes the chaff from the grain. The clean grain is then directed by an elevator conveyor (not shown) to clean grain tank 52 where it can be directed to a truck or grain cart by unloading auger 54.

As the straw reaches the end of the crop processing unit, it is expelled through an outlet 56 to a beater 58. The beater 58 propels the straw out the rear of the combine. The operation of the combine is controlled from an operator's cab 60.

With reference to FIGS. 2 and 3, an exemplary embodiment of threshing and separating portions 32, 34 of the rotor is shown. In the threshing portion 32, crop engaging members 66 are mounted to the rotor body 68. In the separating portion 34, the rotor is provided with two types of crop engaging members, tines 70 and ramp segments 72. The tines 70 are arranged in six axially extending rows with four axially spaced tines in each row. The tines 70 each consist of a base mounting portion 74 bolted to the rotor body 68 and an extending finger-like tine portion 76 that project radially outward from the rotor body 68. In each row, the tines are axially offset from the tines in the circumferentially adjacent rows.

Figure 5:
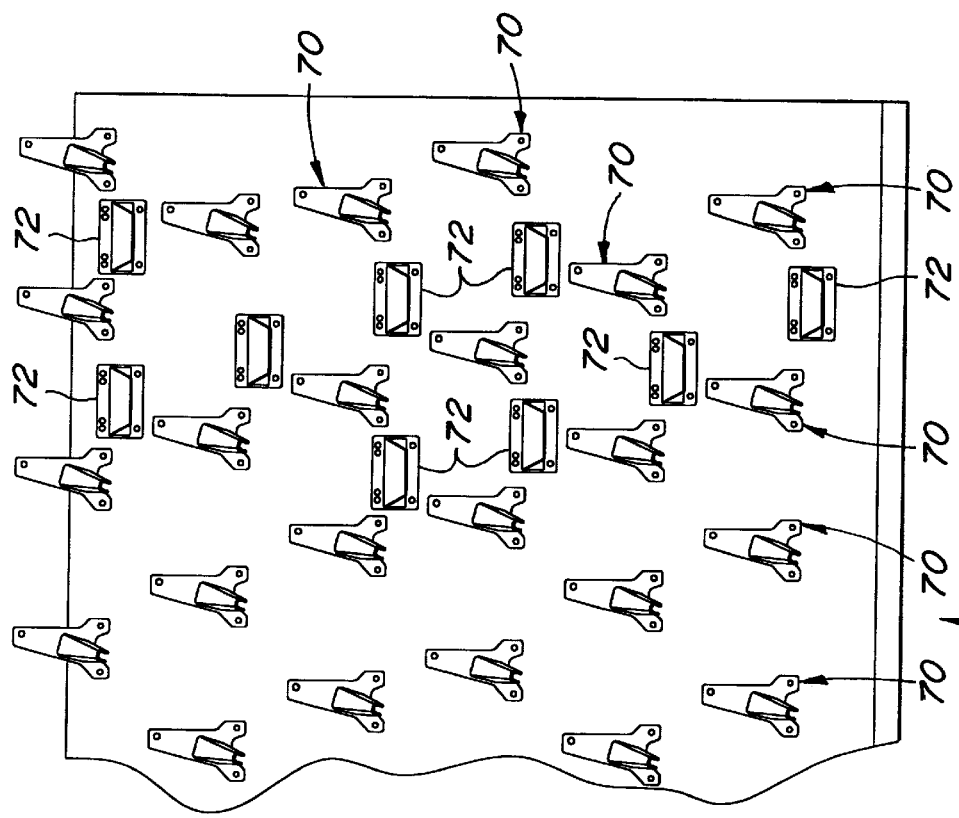
FIG. 5 is another plan view like FIG. 3 of yet another alternative embodiment of the invention.
Figure 4:
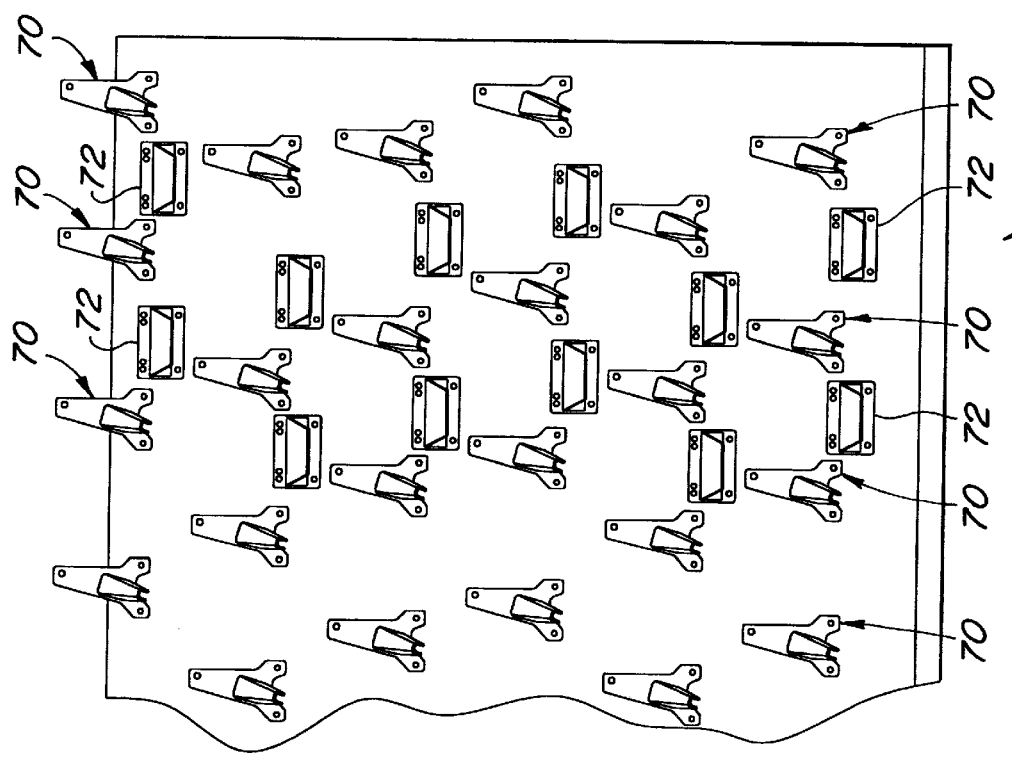
FIG. 4 is a plan view like FIG. 3 of an alternative embodiment of the invention.
Figure 6:
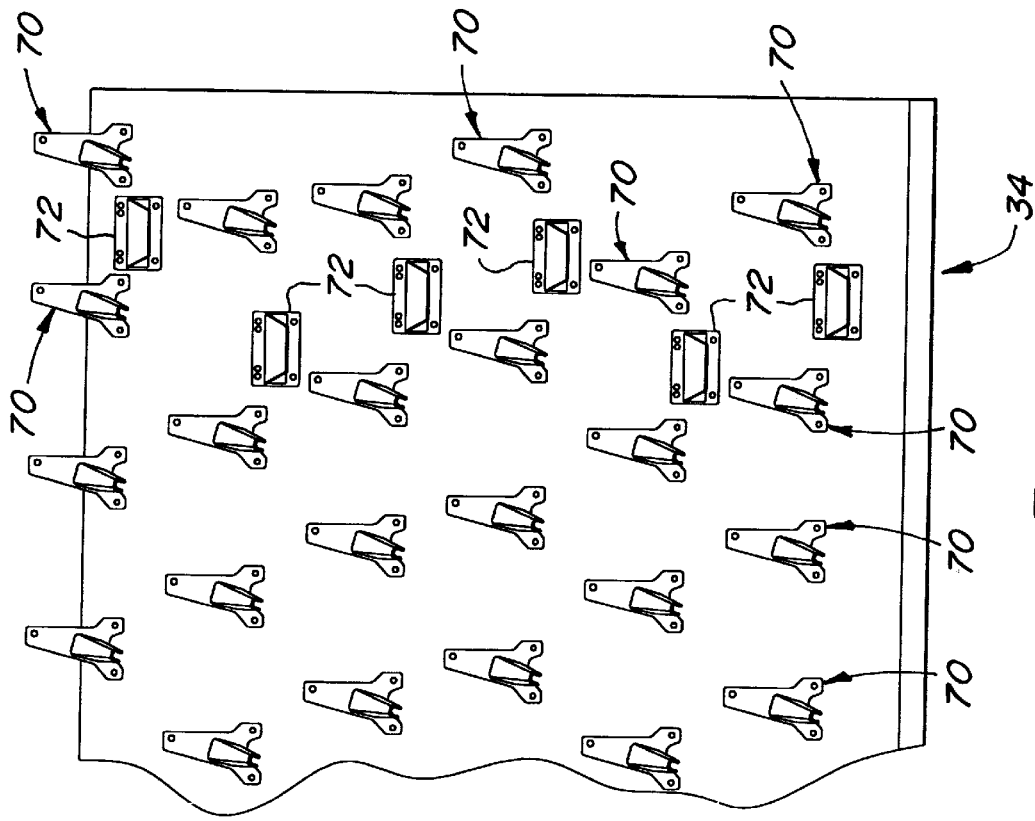
FIG. 6 is still another plan view like FIG. 3 of a further alternative embodiment of the invention.

In the embodiment shown in FIGS. 2 and 3, there are twenty-four tines 70 and eighteen ramp segments 72. In this arrangement, each row alternates between tines and ramp segments, with each row axially beginning and ending with a tine. The arrangement with eighteen ramp segments is the maximum preferred density of ramp segments. Other embodiments with fewer ramp segments are shown in FIGS. 4-6. With fewer ramp segments, less power is required to turn the rotor.

In the embodiment shown in FIG. 4, twelve ramp segments 72 are provided with ramp segments in the last two spaces between the tines 70 in each row of tines. The number of ramp segments is equal to 50% the number of tines. In the embodiment shown in FIG. 5 there are nine ramp segments, with two ramp segments in the last two spaces in three rows of tines and one ramp segment in the last space in the other three rows of tines. The embodiment of FIG. 6 has only six ramp segments with one ramp segment in the last space in each of the rows of tines. The number of ramp segments is equal to 25% the number of tines. Fewer than six ramp segments could be used if desired.

Figure 7:
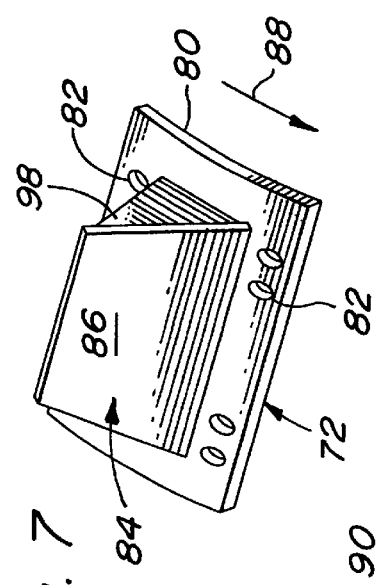
FIG. 7 is a perspective view of a ramp segment according to the present invention.
Figure 8:
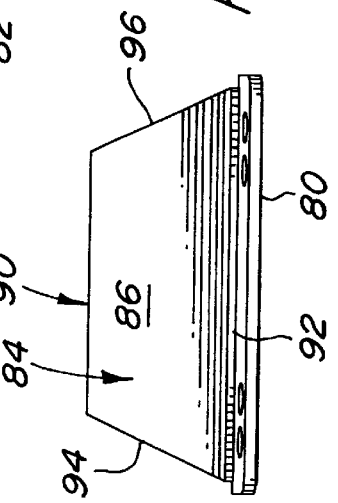
FIG. 8 is a side view of a ramp segment according to the present invention.
Figure 9:
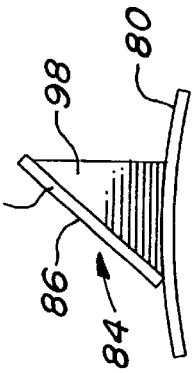
FIG. 9 is an end view of a ramp segment according to the present invention.

The ramp segments are shown in greater detail in FIGS. 7–9. Each ramp segment 72 includes a base plate 80 having a plurality of apertures 82 for bolting the ramp segment to the rotor body 68. A ramp portion 84 extends outwardly from the base plate 80 and presents a face 86 that extends primarily axially of the rotor and projects radially outwardly therefrom. The face 86 is inclined rearward relative to the rotational direction shown by the arrows 88 such that the radially outer edge 90 is rotationally rearward of the radially inner edge 92. Thus, as the rotor rotates, grain impacting the face 86 will be deflected radially outward. While it is preferred to orient the ramp portions 84 axially of the rotor, it may be possible to orient the ramp portion inclined to the rotor axis and deflect grain both radially outward and axially rearward and achieve an increase in the separating capacity.

The face 86 is trapezoidal, having a shorter radially outer edge 90 than inner edge 92. The trapezoidal face also results in inwardly inclined front and rear edges 94, 96. The inclined edges allow crop material to slide off the ramp segments to reduce the likelihood that crop material will collect on the ramp segments. To further prevent material accumulation on the ramp segments, the ramp segments have front and rear side walls 98, only one of which is shown. These side walls are generally triangular in shape. By providing triangular side walls, the ramp segments have a pyramidal shape that narrows toward the outer end so material that wraps around the ramp segment, if any, can slide radially off the ramp segment. The ramp segments are axially wider than the tines and are radially shorter than the tines.

As shown in the drawings, the ramp segments may be positioned axially between the spaced apart tines so that the ramp segments are generally rotationally forward of a tine in the adjacent row of tines. The inclined ramp face 86 functions to deflect grain radially outward through the crop mat so that the grain can pass through the grate 48 and into the combine cleaning system 50. As a result, increased separating capacity is achieved that enables a greater quantity of crop material to pass through the separator in a given time while maintaining or increasing the separating efficiency. The ramp segments of the present invention can be used on single or twin rotor combines described above.

The invention should not be limited to the above-described embodiments, but should be limited solely by the claims that follow.

We claim:

1. A rotary combine for harvesting, threshing, and separating crop material comprising:

a supporting structure;

ground engaging means extending from the supporting structure for transporting the supporting structure around a field;

a rotor housing located inside the supporting structure, the rotor housing having a separating section in which threshed grain is separated from threshed crop material; and a rotor located in the rotor housing and having a separating portion with crop engaging members for engaging crop material passing through the rotor housing, the crop engaging members comprising a plurality of spaced apart tines projecting radially outward from the rotor body to engage the crop material and at least one ramp segment located between spaced tines, the ramp segment having a face that projects radially outward from the rotor body and is inclined rearward relative to a rotational direction of the rotor such that a radially outer edge of the face follows behind a radially inner edge of the face in the direction of rotation of the rotor to engage the crop material to deflect grain radially outward from the rotor body, and the at least one ramp segment having triangular side walls extending circumferentially of the rotor at axially front and rear edges of the face.

2. The combine as defined by claim 1 wherein the number of tines exceeds the number of ramp segments.

3. The combine as defined by claim 2 wherein the number of ramp segments is between twenty-five and fifty percent of the number tines.

4. A rotary combine for harvesting, threshing, and separating crop material comprising:

a supporting structure;

ground engaging means extending from the supporting structure for transporting the supporting structure around a field;

a rotor housing located inside the supporting structure, the rotor housing having a separating section in which threshed grain is separated from threshed crop material; and a rotor located in the rotor housing and having a separating portion with crop engaging members for engaging crop material passing through the rotor housing, the crop engaging members comprising a plurality of spaced apart tines projecting radially outward from the rotor body to engage the crop material, the tines being arranged in axial extending rows along the rotor, and at least one ramp segment located rotationally forward of a tine and having a face that projects radially outward from the rotor body and is inclined rearward relative to a rotational direction of the rotor such that a radially outer edge of the face follows behind a radially inner edge of the face in a direction of rotation, the face engaging the crop material as the rotor rotates to deflect the grain radially outward from the rotor body and the at least one ramp segment having triangular side walls extending circumferentially of the rotor at axially front and rear edges of the face.

5. The combine as defined by claim 4 wherein the at least one ramp segment is axially disposed between two additional tines of an axially extending row of tines.

6. The combine as defined by claim 4 wherein the at least one ramp segment has a width dimension measured axially of the rotor which is greater than a width dimension of the tines.

7. The combine as defined by claim 4 wherein the tines extend radially outward from the rotor body a greater distance than the at least one ramp segment.

8. The combine as defined by claim 4 wherein the at least one ramp segment has axially front and rear edges that are inclined inwardly of the ramp segment whereby the face of the ramp segment is trapezoidal with a shorter width, measured axially of the rotor, at the radially outer edge of the face than at the radially inner edge of the face.

9. A ramp segment for a rotor of a rotary combine comprising;

a base plate adapted to be attached to a rotor body; and a flat face projecting outward from the base plate to project radially outward from the rotor body when mounted thereto, the face being inclined rearward relative to a rotational direction of the rotor body such that a radially outer edge of the face follows behind a radially inner edge of the face in the direction of rotation, the face engaging the crop material as the rotor rotates to deflect grain radially outward from the rotor body; and triangular side walls extending circumferentially of the rotor at axially front and rear edges of the face.

10. The ramp segment as defined by claim 9 wherein the face has axially front and rear edges that are inclined inwardly of the ramp segment whereby the face of the ramp segment is trapezoidal with a shorter width, measured axially of the rotor, at the radially distal edge of the face than at the radially inner edge of the face.

* * * * *